United States Patent [19]

Taplin

[11] Patent Number: 4,584,967
[45] Date of Patent: Apr. 29, 1986

[54] PET COLLAR/LEASH

[76] Inventor: Patricia A. Taplin, 1404 Biscaya Dr., Surfside, Fla. 33154

[21] Appl. No.: 709,214

[22] Filed: Mar. 7, 1985

[51] Int. Cl.$^4$ ............................................. A01K 27/00
[52] U.S. Cl. ..................................... 119/109; 119/106
[58] Field of Search .................... 119/106, 109; 2/312, 2/317, 319, 322; 128/DIG. 15; 224/226

[56] References Cited

U.S. PATENT DOCUMENTS

| 887,072 | 5/1908 | Delaney | 119/106 |
| 2,317,176 | 4/1943 | Byrd | 224/226 X |
| 2,929,358 | 3/1960 | Morrow | 119/109 |
| 3,477,410 | 11/1969 | Lettieri | 119/109 |
| 4,027,666 | 6/1977 | Marx | 128/DIG. 15 X |
| 4,091,766 | 5/1978 | Colliard | 119/106 |
| 4,384,548 | 5/1983 | Cohn | 119/109 |

FOREIGN PATENT DOCUMENTS

| 975823 | 3/1951 | France | 119/106 |
| WO85/01857 | 5/1985 | PCT Int'l Appl. | 119/106 |
| 859856 | 1/1961 | United Kingdom | 119/109 |

Primary Examiner—Robert P. Swiatek
Attorney, Agent, or Firm—Jesus Sanchelima

[57] ABSTRACT

A collar/leash combination for pets wherein a flexible member with a buckle attached to one end so that a collar can be formed by inserting the other end of the member through the buckle. Velcro material or loops are used to keep the leash section of the member wound around the pet's collar when the leash is not in use. A handle loop is formed at the other end of the flexible member. An alternate embodiment uses a pouch to keep the leash in place, attached to the pet's collar.

4 Claims, 6 Drawing Figures

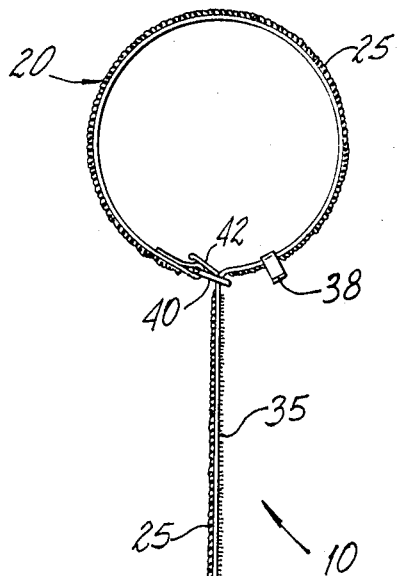
Fig-1-
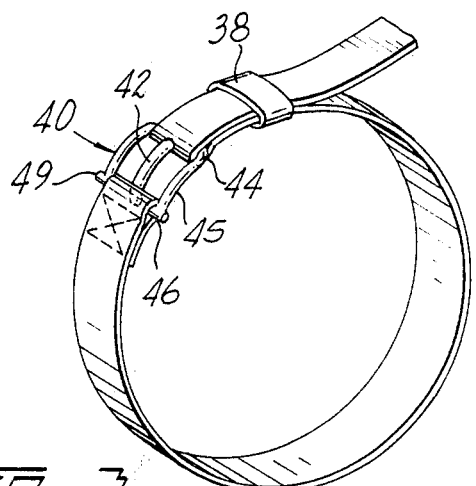
Fig-3-
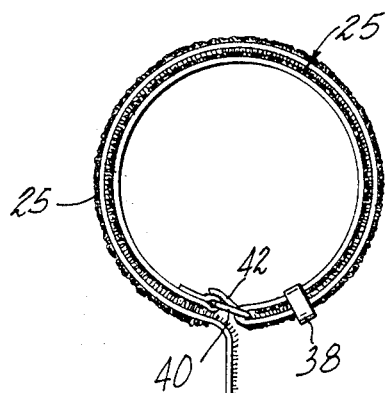
Fig-2-
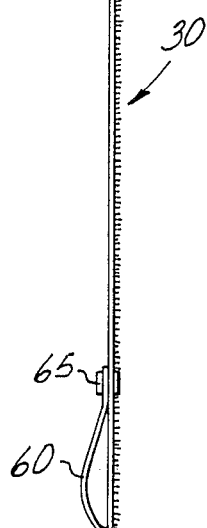
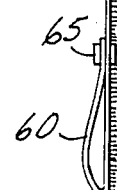

PET COLLAR/LEASH

BACKGROUND OF THE INVENTION

1. Field of the Invention

The present invention relates to leashes for pets and more particularly to leashes that may stay with the pet even if not in use.

2. Description of the Prior Art

It is common for leashes to be misplaced by the user. This problem is solved here by providing a washable leash that can be stored on the pet's collars.

Applicant believes that the closest reference corresponds to U.S. Pat. No. 4,328,767 issued to Edwin R. Peterson. However, it differs from the present invention because in that it requires a rather complicated heavy moving mechanism for extending and retracting the leash. The present invention does not involve such a mechanism and it is considerably lighter.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a leash that may stay with the pet when not in use.

It is another object of the present invention to provide a collar/leash combination that is inexpensive to manufacture.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a collar/leash combination having the leash extended.

FIG. 2 shows the leash wound one turn around the collar.

FIG. 3 illustrates a detailed view of the collar section and buckle.

DETAILED DESCRIPTION OF THE PREFERRED EMBODIMENT

Figure 4:
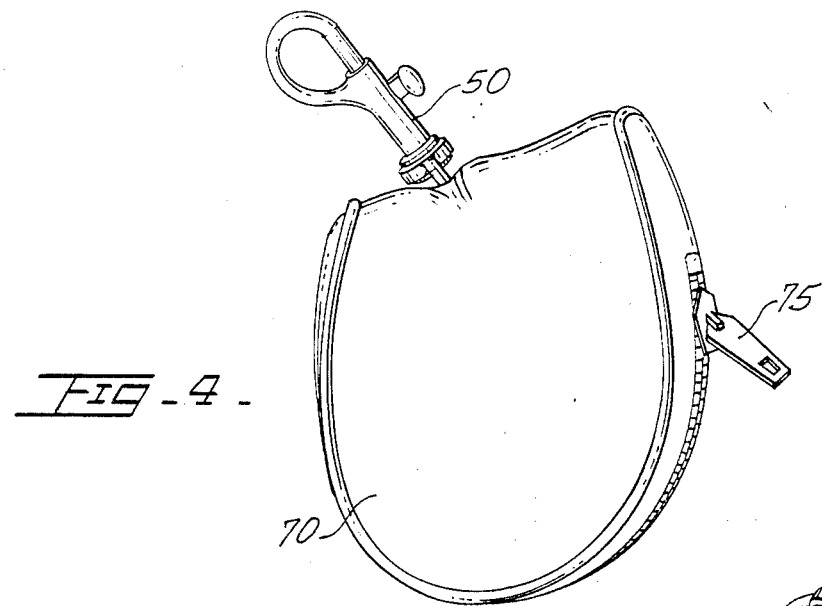
FIG. 4 shows the alternate embodiment having the leash inside a pouch.

Referring now to FIG. 1, where the collar/leash combination is referred to with numeral 10 it can be observed that it consists, primarily, of a flat member with two sections or parts: collar 20 and leash 30. In the preferred embodiment, collar 20 is formed by inserting leash 30 through buckle device 40. To facilitate the identification of the surfaces of the flat member, they will be referred to as outer and inner surfaces.

The outer surface of collar 20 is covered with Velcro material 25 of one type. One surface of the leash has Velcro material 35 of the opposite type of material 25 so that the gripping effect is achieved when leash 30 is wound over collar 20. Also, instead of Velcro material there are other equivalent devices that may be used to keep leash 30 in place around collar 20, namely, several loops may be used or snap in devices, etc.

In FIG. 2, we can observe that, in the preferred embodiment, the leash has been wound one turn and the gripping effect of opposite Velcro types 25 and 35 keep the leash neatly wound around collar 20.

Figure 5:
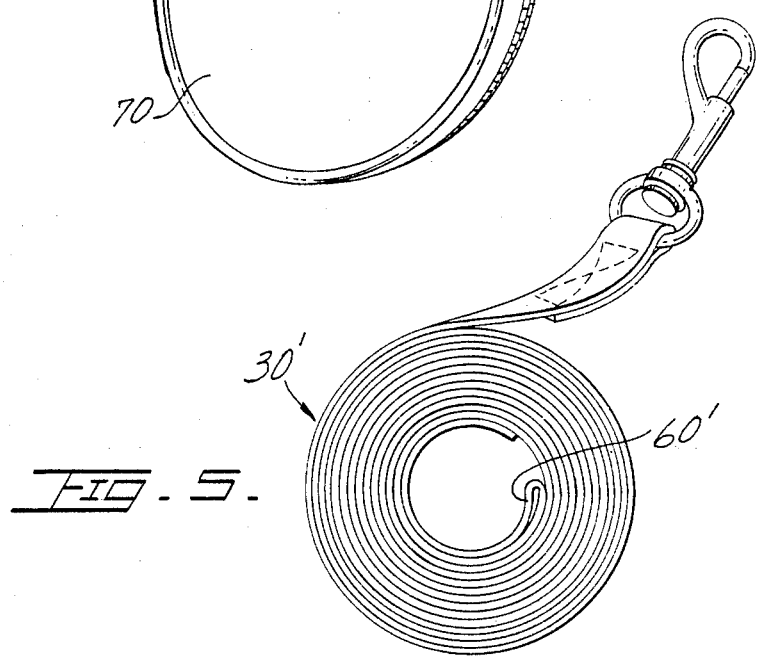
FIG. 5 represents the leash section with a quick connect link.
Figure 6:
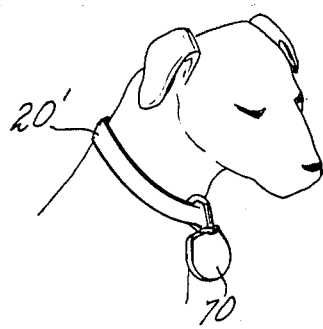
FIG. 6 shows the invention stored attached to the pet's collar.

In FIG. 3, we can see a detailed view of collar section 20. Buckle 40 has pin 42 extending beyond buckle frame 45 so that as leash 30 is pulled pin 42, pivoting on one end 44 of frame 45, is prevented by distal end 46 from turning. Basically, buckle 40 is similar to those used in belts but it is installed backwards to prevent that pulling the leash would cause the pet to choke off. Also, loop 38 helps in keeping this possible movement to minimum. Loop 38 is movable along the collar so that it is easy to have leash 30 inserted therethrough and also to adjust to different sizes. Another important use of loop 38 is to cover pin 42 of buckle 40 so that it does not make direct contact with the pet. Buckle 40 has buckler stopper 49 to prevent loop 38 from going through one way and handle stopper 65 prevents loop 38 from going through the other way. Instead of the illustrated buckle 40, it is possible to have two independent pieces for collar 20 and leash 30, with a quick connect/disconnect buckle or device 50, as shown in the alternate embodiment represented in FIGS. 4 through 6. The advantage of using buckle 40 is that it is a simpler, less expensive approach that is flatter and lighter than device 50.

Also, it is to be noted from FIG. 1 that the Velcro material, in the preferred embodiment, is used on the outer surface of collar 20, on one side of leash 30 and on one half of the other side of leash 30. If collar/leash combination 10 is to be extended then, in the preferred embodiment, the first approximately one third (corresponding to the collar section) has Velcro on one surface of one type, then the rest of that surface is covered with Velcro of the opposite type. The other surface is covered, on the middle one third section, with Velcro of the same type used in the collar section. In this preferred embodiment, the length of the leash section is approximately two times the perimeter of the collar, which provides a comfortable leash length and it does not look to bulky when stored around the pet's collar.

Handle loop 60, at the end of leash 30, does not have Velcro on one side since it would be uncomfortable for the user.

It is possible to replace the above described Velcro sections with patches or smaller intermittent sections of Velcro in order to make the collar/leash combination less expensive and bulky. These patches of Velcro, of course, need to be sufficiently large so that they may coincide even for pets requiring different collar sizes.

The alternate embodiment shown in FIGS. 4; 5 and 6 include pouch 70 with zipper 75. Leash 30' has a quick connect/disconnect buckle 50 attached on one end and the other end has handle loop 60'. Collar 20' and leash 30' are independent and removable from each other. Buckle 50 protrudes through an opening in pouch 70 so that leash 30' can be neatly stored inside and pouch 70 including leash 30' is attached to the pet's collar when not in use.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A collar/leash combination for pets, comprising:
   A. a flexible flat member having outer and inner surfaces and further including buckle means on one end having a frame and a locking pin that pivots on said frame and said pin being insertable through said flexible member so that a collar may be formed by passing the other end of said member through said buckle; and
   B. means for keeping in place said flexible member including Velcro material of one type on said outer surface's section of said member that is formed into a collar and the rest of said outer surface having Velcro material of the opposite type, and said inner surface of said member having Velcro material of the same type used on said outer surface's collar section.

2. The device set forth in claim 1 wherein said Velcro material used on said inner surface of said member starts at a point past said collar so that there is no Velcro material on the inner surface of said collar.

3. The device set forth in claim 2 wherein said Velcro material type used in the collar covers one third of said member on the outer surface and one third on the inner surface, past said collar.

4. The device set forth in claim 3 wherein the other end of said member includes a handle loop.

* * * * *